(12) United States Patent
Lee et al.

(10) Patent No.: US 12,244,211 B2
(45) Date of Patent: Mar. 4, 2025

(54) ROTOR COOLING SYSTEM AND METHOD WITH DYNAMIC FLOW RATE CONTROL

(71) Applicant: GM GLOBAL TECHNOLOGY OPERATIONS LLC, Detroit, MI (US)

(72) Inventors: Jared Lee, Livonia, MI (US); Robert Seungmo Lee, Commerce Township, MI (US); Jeffrey R Kelly, Wittaker, MI (US); Addison T Solak, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 17/931,012

(22) Filed: Sep. 9, 2022

(65) Prior Publication Data

US 2024/0083230 A1    Mar. 14, 2024

(51) Int. Cl.
| | |
|---|---|
| *H02K 9/19* | (2006.01) |
| *H02K 1/32* | (2006.01) |
| *H02K 9/193* | (2006.01) |
| *B60K 1/00* | (2006.01) |
| *B60K 11/02* | (2006.01) |

(52) U.S. Cl.
CPC ............... *H02K 9/19* (2013.01); *H02K 1/32* (2013.01); *H02K 9/193* (2013.01); *B60K 1/00* (2013.01); *B60K 2001/006* (2013.01); *B60K 11/02* (2013.01)

(58) Field of Classification Search
CPC .... B60K 1/00; B60K 11/02; B60K 2001/006; H02K 1/32; H02K 2213/09; H02K 7/116; H02K 9/19
See application file for complete search history.

(56) References Cited

U.S. PATENT DOCUMENTS

| | | | |
|---|---|---|---|
| 6,269,297 B1 * | 7/2001 | Hosomi | B60K 28/16 |
| | | | 701/84 |
| 6,325,470 B1 * | 12/2001 | Schneider | B60L 7/26 |
| | | | 303/186 |
| 2013/0151057 A1 * | 6/2013 | Matsubara | B60K 6/547 |
| | | | 180/65.265 |
| 2017/0033722 A1 * | 2/2017 | Ochs | H02P 27/085 |
| 2017/0317631 A1 * | 11/2017 | Lee | B60L 15/20 |
| 2021/0135538 A1 * | 5/2021 | Remboski | H02K 7/088 |
| 2022/0302795 A1 * | 9/2022 | Barden | H02K 1/32 |

* cited by examiner

*Primary Examiner* — Naishadh N Desai
(74) *Attorney, Agent, or Firm* — Lorenz & Kopf LLP

(57) ABSTRACT

Systems and methods provide active control of rotor cooling. In a number of embodiments, a system includes a controller coupled with an electric machine having a rotor. The controller evaluates parameters related to the electric machine for flow rate requirements of the rotor, where the flow rate requirements relate to cooling of the rotor. A flow rate of a fluid for cooling the rotor is computed, where the flow rate is based on a composite of the flow rate requirements. A control valve signal is delivered to set a control valve to supply the flow rate to the rotor based on the parameters.

20 Claims, 5 Drawing Sheets

ROTOR COOLING SYSTEM AND METHOD WITH DYNAMIC FLOW RATE CONTROL

INTRODUCTION

The present disclosure relates to electric motor systems, such as for electric vehicles, and more particularly relates to systems and method for active fluid cooling of the motor rotor.

Electric motors are employed in a wide range of equipment drive applications. For example, propulsion systems in electric vehicles include an electric motor that drives the vehicle's wheels, often through a driveline with some form of gearing system. The gearing system may include a gearbox near the motor that contains a fluid, such as an oil. The fluid provides lubrication for the gears and may also provide a cooling function. The fluid may also be used to cool the electric motor such as by supplying a flow to the motor's stator. In many applications, the motor's stator generates significantly more heat than the motor's rotor. The fluid to the motor is supplied at a fixed flow rate that is selected for maximum cooling requirements.

Because the stator does not rotate, supplying cooling fluid does not add friction. If fluid is supplied around a rotor, spin losses would be incurred as friction is created when the rotor spins through the oil. In applications such as electric vehicles, added friction losses lead to a lower driving range for the vehicle before charging of the battery is required.

It would be desirable to supply efficient cooling to the rotor of an electric motor while minimizing the drawbacks of friction loss. It would also be desirable to maximize the driving range of an electric vehicle. Furthermore, other desirable features and characteristics of the present disclosure will become apparent from the subsequent detailed description and the appended claims, taken in conjunction with the accompanying drawings and the foregoing introduction.

SUMMARY

Systems and methods provide active control of rotor cooling. In a number of embodiments, a system includes a controller coupled with an electric machine having a rotor. The controller evaluates parameters related to the electric machine for flow rate requirements of the rotor, where the flow rate requirements relate to cooling of the rotor. A flow rate of a fluid for cooling the rotor is computed, where the flow rate is based on a composite of the flow rate requirements. A control valve signal is delivered to set a control valve to supply the flow rate to the rotor based on the parameters.

In additional embodiments, the parameters comprise a torque demand of the electric machine.

In additional embodiments, the controller is configured to: receive cooling requirements for additional cooling needs; combine the cooling requirements with the flow rate requirements of the rotor to compute a pump flow rate; and deliver a pump signal to control a pump to supply the pump flow rate.

In additional embodiments, a gear unit is engaged with the electric machine and has a gear unit requirement for cooling. A stator is disposed around the rotor and has a stator requirement for cooling. The cooling requirement include the gear unit requirement and the stator requirement. The pump is configured to circulate the fluid to the gear unit to meet the gear unit requirement and to the stator to meet the stator requirement.

In additional embodiments, the rotor includes a shaft with a bore, wherein the control valve is disposed to control the flow rate through the bore.

In additional embodiments, a guide extends into the bore and is configured to center the shaft, where the control valve extends into the guide.

In additional embodiments, the parameters include a torque command of the electric machine, a temperature of the fluid, and a speed of the electric machine.

In additional embodiments, the controller is configured to dynamically vary the flow rate through the rotor based on changes in the parameters.

In additional embodiments, the electric machine is configured as a traction motor of a vehicle.

In additional embodiments, a stator is disposed around the rotor with a gap defined between the stator and the rotor. The rotor includes a shaft having a bore, with openings extending through the shaft. The openings register with the bore and the gap, so the fluid circulates through the gap. The control valve is configured to control the fluid circulated through the gap.

In a number of additional embodiments, a method includes evaluating, by a controller, parameters related to an electric machine for flow rate requirements of a rotor of the electric machine. The flow rate requirements relate to cooling of the rotor. The controller computes a flow rate of a fluid for cooling the rotor, where the flow rate is based on a composite of the flow rate requirements. The controller delivers a control valve signal to operate a control valve to supply the flow rate to the rotor based on the parameters.

In additional embodiments, the evaluating parameters comprise evaluating a torque demand of the electric machine.

In additional embodiments, the controller receives cooling requirements for additional cooling needs. The controller combines the cooling requirements with the flow rate requirements of the rotor. The controller computes a pump flow rate using the cooling requirements and the flow rate requirements. The controller delivers a pump signal to control a pump to supply the pump flow rate.

In additional embodiments, a gear unit engages with the electric machine and has a gear unit requirement for cooling. A stator is disposed around the rotor and has a stator requirement for cooling. The cooling requirements include the gear unit requirement and the stator requirement. The pump circulates the fluid to the gear unit to meet the gear unit requirement and to the stator to meet the stator requirement.

In additional embodiments, a shaft has a bore and is a part the rotor. The control valve controls the flow rate through the bore.

In additional embodiments, a guide extends into the bore centering the shaft. The control valve extends into the guide.

In additional embodiments, the evaluating parameters comprise evaluating a torque command of the electric machine, a temperature of the fluid, and a speed of the electric machine.

In additional embodiments, the controller dynamically varies the flow rate through the rotor based on changes in the parameters.

In additional embodiments, a stator is disposed around the rotor. A gap is defined between the stator and the rotor. A shaft is included in the rotor and a bore extends into the shaft. Openings extend through the shaft and register with the bore and the gap. The fluid is circulated through the gap. The control valve controls the fluid circulated through the gap.

In a number of other embodiments, a rotor cooling system for a drive system of a vehicle includes an electric machine disposed in the drive system and configured to generate a torque to propel the vehicle. A controller is coupled with an electric machine having a rotor. The controller configured to evaluate parameters related to the electric machine for flow rate requirements of the rotor, where the flow rate requirements relate to cooling of the rotor. The controller computes a flow rate of a fluid for cooling the rotor, where the flow rate is based on a composite of the flow rate requirements. The controller delivers a control valve signal to operate a control valve to supply the flow rate to the rotor based on the parameters.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term engine refers to an internal combustion engine and the term motor refers to an electrical machine that may operate as a motor and/or a generator. The term hybrid powertrain refers to a vehicle propulsion system that employs both an engine and a motor. Also as used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
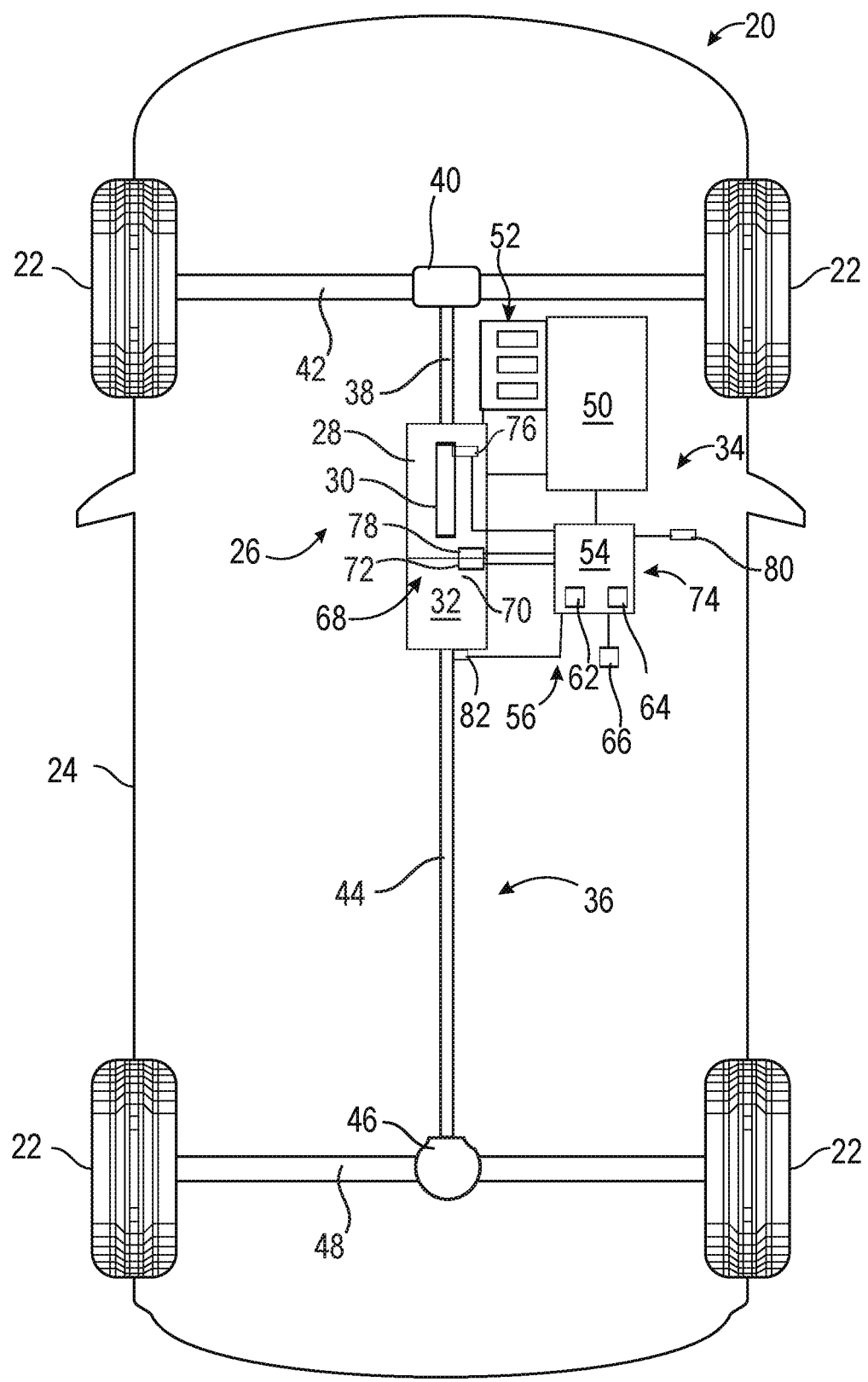
FIG. 1 is a schematic illustration of an electric vehicle with a drive system including a cooled rotor, in accordance with various embodiments.

Referring to FIG. 1, certain features of a vehicle 20 are illustrated in functional block diagram form. In various embodiments, the vehicle 20 includes a number of wheels 22. The vehicle 20 may be any one of a number of different types of automobiles, such as, for example, a sedan, a wagon, a truck, or a sport utility vehicle, and may be two-wheel drive (i.e., rear-wheel drive or front-wheel drive), four-wheel drive, or all-wheel drive. In other embodiments, the vehicle 20 may be any one of another different types of land, sea or air vehicle with a motor supplying power to drive equipment, such as to propel the vehicle 20. As depicted in FIG. 1, the vehicle 20 includes a body 24 supported by the wheels 22. The body 24 may be arranged on, or integrated with, a chassis (not shown). In various embodiments the vehicle 20 may differ from that depicted in FIG. 1. For example, in certain embodiments the number of wheels 22, the drive axles, and/or the style of the body 24 may vary.

An electric drive system with a propulsion system 26 is included in a vehicle 20. In general, the propulsion system 26 may include an electric machine 30, a gear unit 32, and a propulsion control system 34. In the embodiment illustrated in FIG. 1, the propulsion system 26 supplies torque to drive the wheels 22 through a driveline 36. In various embodiments, the driveline 36 may be configured to couple the front wheels 22 with the propulsion system 26, such as through shaft 38, gearbox 40 and axle 42. In other embodiments, the driveline 36 may be configured to couple the rear wheels 22 with the propulsion system 26, such as through the shaft 44, the gearbox 46 and the axle 48. As illustrated, the driveline 36 is configured to couple all four wheels 22 with the propulsion system 26.

The electric machine 30 may be any of various types of electric motors that operate to supply rotary torque to the driveline 36 as to function as a traction motor for the vehicle 20. The electric machine 30 may also be capable of operating as a generator receiving rotary torque from the driveline 36. The gear unit 32 connects the electric machine 30 with the driveline 36 and is capable of operating to transfer torque in either direction. The gear unit 32 may include a number of meshing gears to transfer torque to and from the driveline 36 and may be configured with a single fixed gear ratio. In embodiments, the electric machine 30 and the gear unit 32 may be integrated in an electric drive unit. The gearboxes 40, 46 transfer torque from their respective shaft 38, 44 to their respective axle 42, 48 and may provide a differential function in splitting torque to the wheels 22. The gearboxes 40, 46 may also each have a single fixed gear ratio.

The electric machine 30 is supplied with power by a rechargeable energy storage system (RESS) 50. The RESS 50 is mounted on the body 24 of the vehicle 20, and is electrically connected with the power electronics 52. In the current embodiment, the RESS 50 comprises at least one rechargeable battery having a pack of battery cells. In other embodiments the RESS 50 comprises another type of electrical energy storage device. The power electronics 52 may include various electric vehicle elements such as a power inverter module, an accessory power module, an onboard charger module, etc.

A controller 54 is coupled with the electric machine 30, the power electronics 52, the RESS 50, the propulsion system 26, and various sensors as described below. As will be appreciated, the controller 54 may be coupled to a number of other devices and systems of the vehicle 20. The controller 54 utilizes data and information and measured values from the various sensors. Generally, the controller 54 is configured to receive inputs from the various sensors which are configured to generate signals in proportion to various physical input parameters associated with the vehicle 20, its subsystems, and other interrelated systems. For example, based on the parameters the controller 54 is configured to operate the electric machine 30 at various rotational speeds and in both rotational directions to propel the vehicle at various speeds and in forward and reverse directions.

As illustrated in FIG. 1, the controller 54 is a part of or comprises a computer system 56. It will be appreciated that the controller 54 may otherwise differ from the example depicted in FIG. 1. The controller 54 may be configured as any number of controllers and/or microcontrollers in communication with each other. For example, separate individual controllers may control aspects of the propulsion system 26 and the RESS 50. Accordingly, references to one controller include arrangements with one or more controllers. The controller 54 is coupled in the propulsion control system 34, such as with the propulsion system 26, and is coupled with other devices and systems of the vehicle 20. The controller 54 may accept information from various sources, process that information, and provide control commands based thereon to effect outcomes such as operation of the vehicle 20 and its systems, including of the propulsion control system 34. In the depicted embodiment, the controller 54 includes a processor 62 and a memory device 64, and is coupled with a storage device 66. The processor 62 performs the computation and control functions of the controller 54, and may comprise any type of processor or multiple processors, single integrated circuits such as a microprocessor, or any suitable number of integrated circuit devices and/or circuit boards working in cooperation to accomplish the functions of a processing unit. During operation, the processor 62 may execute one or more programs and may use data, each of which may be contained within the storage device 66 and as such, the processor 62 controls the general operation of the controller 54 in executing the processes described herein, such as the processes and methods described in greater detail below.

The memory device 64 may be any type of suitable memory. For example, the memory device 64 may include volatile and nonvolatile storage in read-only memory (ROM), random-access memory (RAM), and keep-alive memory (KAM), for example. KAM is a persistent or non-volatile memory that may be used to store various operating variables while the processor 62 is powered down. The memory device 64 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 54. In the depicted embodiment, the memory device 64 may store the above-referenced programs along with one or more stored values of the data such as for short-term data access.

The storage device 66 stores the data, such as for long-term data access for use in automatically controlling the vehicle 20 and its systems. The storage device 66 may be any suitable type of storage apparatus, including direct access storage devices such as disk drives and flash systems. The storage device 66 comprises a non-transitory computer readable medium configured to store data, such as on the vehicle 20. In one exemplary embodiment, the storage device 66 comprises a source from which the memory device 64 receives the programs that execute one or more embodiments of one or more processes of the present disclosure. In another exemplary embodiment, the programs may be directly stored in and/or otherwise accessed by the memory device 64. The programs represent executable instructions, used by the controller 54 in processing information and in controlling the vehicle 20 and its systems, including the propulsion control system 34 and a cooling system 68 associated with the electric machine 30 and the gear unit 32, as further described below.

As part of the cooling system 68, the gear unit 32 includes a sump 70 that contains a supply of fluid, in this case oil, that is circulated by a pump 72. The pump 72 may be electric driven and in this embodiment is coupled with the controller 54 for controlled operation. In general, the pump 72 circulates fluid within the gear unit 32 and the electric machine 30. A cooling control system 74 is provided that generally includes the controller 54, a control valve 76, a temperature sensor 78 disposed in the sump 70, a throttle position sensor 80, and a vehicle speed sensor 82, and is coupled with the pump 72. In other embodiments, the cooling control system 74 may monitor other parameters of the propulsion system 26 or of the vehicle 20 generally, and may command control actions based on those other parameters. While the components of the propulsion control system 34 and the cooling control system 74 are depicted as being part of the same system, it will be appreciated that in certain embodiments these features may comprise multiple systems. In addition, in various embodiments the cooling control system 74 may comprise all or part of, and/or may be coupled to, various other vehicle devices and systems, such as, among others, the propulsion system 26 and/or other systems of the vehicle 20.

Figure 2:
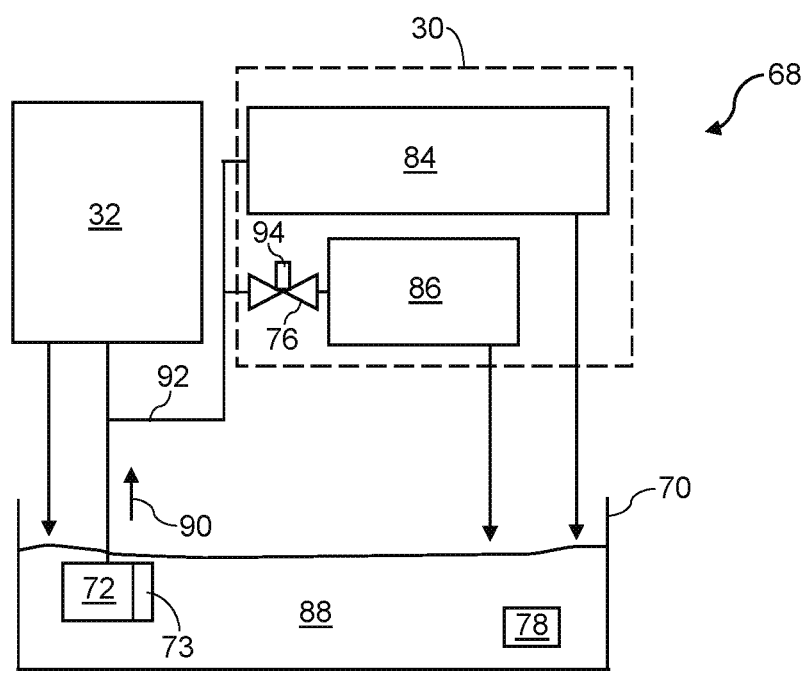
FIG. 2 is a schematic illustration of a cooling system of the drive system of FIG. 1, in accordance with various embodiments.

Referring to FIG. 2, a part of the cooling system 68 is illustrated in schematic form and with added detail. The electric machine 30 includes a stator 84 and a rotor 86. The sump 70 contains a quantity of fluid 88, in this embodiment oil. The pump 72 is driven by an electric motor 73, which is coupled with the controller 54. The pump 72 delivers a supply 90 of the fluid 88 from the sump 70 through a conduit system 92 to each of the gear unit 32, the stator 84 and the rotor 86. The fluid 88 returns to the sump 70 after flowing through each of the gear unit 32, the stator 84 and the rotor 86. The supply 90 of the fluid 88 directed to the gear unit 32 is delivered at a set design flow rate for the output pressure of the pump 72, and the supply 90 delivered to the stator 84 is also delivered at a set design flow rate, in each case, such as by including a calibrated orifice size in the conduit system 92.

The supply 90 of the fluid 88 directed to the rotor 86 passes through the control valve 76. Accordingly, the flow rate of the fluid 88 is controllable as a function of determinable parameters of the propulsion system 26 and/or of the vehicle 20 by varying the degree to which the control valve 76 is open. In the current embodiment, the control valve 76 is a variable force solenoid valve that includes an electric actuator in the form of a solenoid 94. Accordingly, the control valve 76 controls pressure (and therefore flow rate), of the fluid 88 delivered to the rotor 86, such as in proportion to the current level of the signal supplied to the solenoid as controlled by the controller 54. A higher pressure output from the control valve 76 results in an increased flow rate of the fluid 88 supplied to cool the rotor 86. A lower pressure output from the control valve 76 results in decreased flow rate of the fluid 88 supplied to cool the rotor 86. Control may be calibrated to optimize fluid flow rate to balance operating efficiency with cooling requirements across a spectrum of operating conditions of the electric machine 30. In other embodiments, a different type of valve actuator may be used. For example, other electrically driven translatable or rotatable actuator elements may be used to control orifice size.

Figure 3:
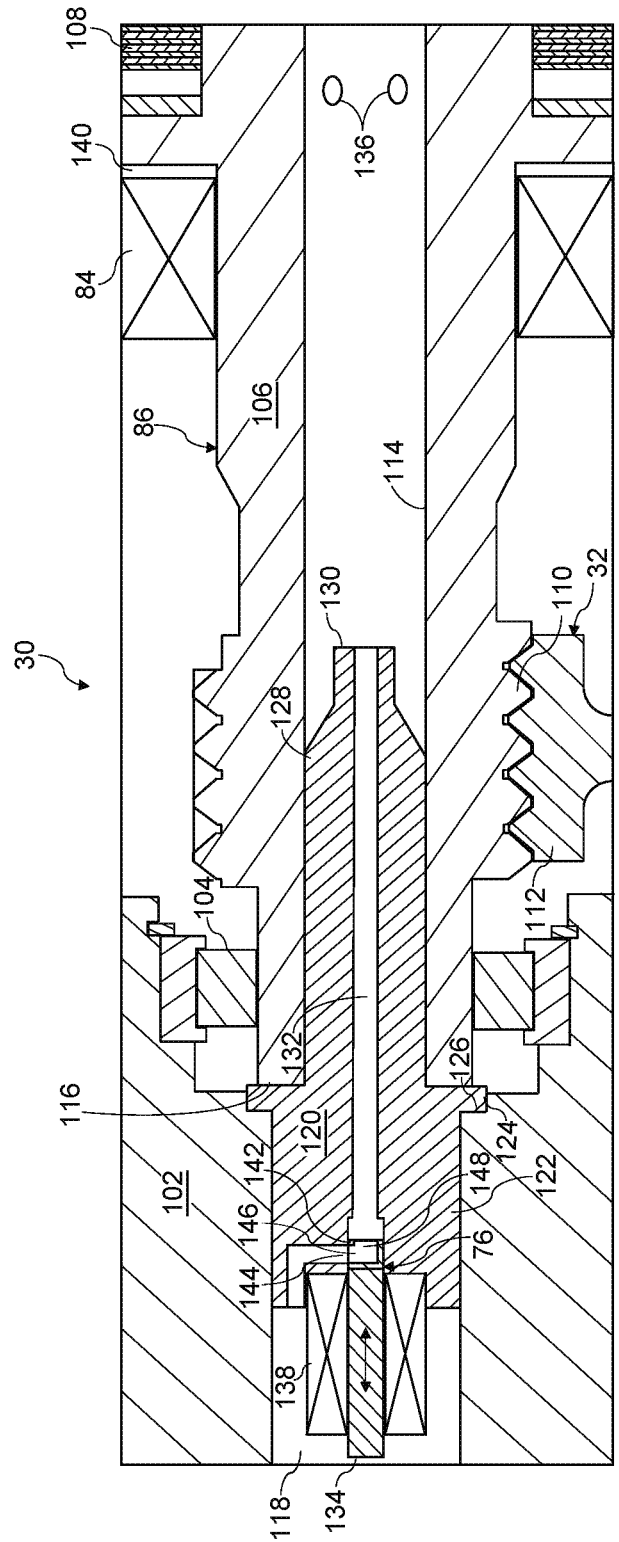
FIG. 3 is a fragmentary, cross sectional illustration of a part of the drive system of FIG. 1, in accordance with various embodiments.

Referring to FIG. 3, a cross section of a part of the electric machine 30 shows the location of the control valve 76 in this embodiment. The rotor 86 is rotatably supported within the stator 84 and on a housing 102 of the electric machine 30 by a bearing assembly 104. The rotor 86 includes a shaft 106 and a core assembly 108 supported on the shaft 106. An output gear 110 is fixed on the shaft 106 and meshes with a gear 112 of the gear unit 32 to supply torque out of the electric machine 30. The shaft 106 has a longitudinal bore 114 that opens through its end 116 registering with a cavity 118 in the housing 102. The cavity 118 forms a part of the conduit system 92 supplied with the fluid 88 by the pump 72.

A guide 120 is disposed at the interface between the shaft 106 and the housing 102. The guide 120 includes a cylindrical section 122 that is disposed in the cavity 118, a flange 124 that extends radially outward from the cylindrical section 122 and abuts the housing 102 at a shoulder 126, and a pin 128 that extends into the bore 114. The pin 128 extends longitudinally from the flange 124 on the side of the flange 124 opposite the cylindrical section 122, and is sized to fit within the bore 114. The pin 128 includes a tapered end 130 at its end opposite the flange 124. The tapered end 130 has a diameter substantially smaller that the diameter of the bore 114. A bore 132 extends through the guide 120 from its end 116 in the cavity 118 to the tapered end 130 in the bore 114. Accordingly, the guide 120 provides a flow path from the cavity 118 to the bore 114 through the bore 132. The shaft 106 includes a number of openings 136 that extend radially through the shaft and are disposed to register with the bore 114 and with a gap 140 between the rotor 86 and the stator 84. Accordingly, the fluid 88 is admitted to the gap 140 by the bores 132, 114 and the openings 136 to cool the stator 84 rotor 86 interface. It has been found as part of the current disclosure that spin loss of the rotor 86 is directly correlated to the amount of fluid 88 supplied to the rotor 86 and the amount entering the gap 140 between the stator 84 and the rotor 86, with more fluid 88 leading to greater losses.

The control valve 76 is positioned in the bore 132 of the guide 120 to control the fluid 88 flowing therethrough, enabling control of the amount of fluid 88 admitted through the rotor 86. The solenoid 94 is disposed in the cavity 118. The solenoid 94 includes a coil 138 and a core 134 that moves in response to a magnetic field generated by the coil 138, such as in response to a current supplied under control of the controller 54. The control valve 76 includes a spool 142 connected with the core 134. The guide 120 serves as the valve body containing the spool 142. Orifices 144 are provided through the guide 120 to supply the fluid from the cavity 118 to the spool 142. The spool 142 includes orifices 146 that register to varying degrees with the orifices 144 depending on the positioning of the core 134. The orifices 146 register with a longitudinal bore 148 in the spool 142 that opens to the bore 132. The orifices 144 and 146, the longitudinal bore 148 and the bore 132 are sized to deliver the maximum flow rate that is required by the rotor 86 under all operating conditions, when the control valve 76 is fully open. Movement of the spool 142 by the core 138 may result in a full open state, a range of throttled states, or a fully closed state of the control valve 76, depending on cooling needs of the rotor 86.

When the electric machine 30 is assembled, the control valve 76 is inserted into the bore 132 and the guide 120 is then inserted into the cavity 118 until the flange 124 engages the shoulder 126 of the housing 102. The bearing assembly 104 may be positioned into the housing 102 before or following insertion of the guide 120. The rotor 86 is then moved into position with the tapered end 130 of the guide 120 entering the bore 114 and guiding the shaft 106 into an axially centered position. As the shaft 106 moves closer to the flange 124, the guide 120 centers the shaft 106 relative to the bearing assembly 104 so that the shaft 106 may move into its assembled position with its end 116 engaging the flange 124 and extending through the bearing assembly 104. Accordingly, the guide 120 serves a guiding function is assembling the rotor 86 to be supported by the bearing assembly 104, in addition to providing a controllable flow path for the fluid 88.

Figure 4:
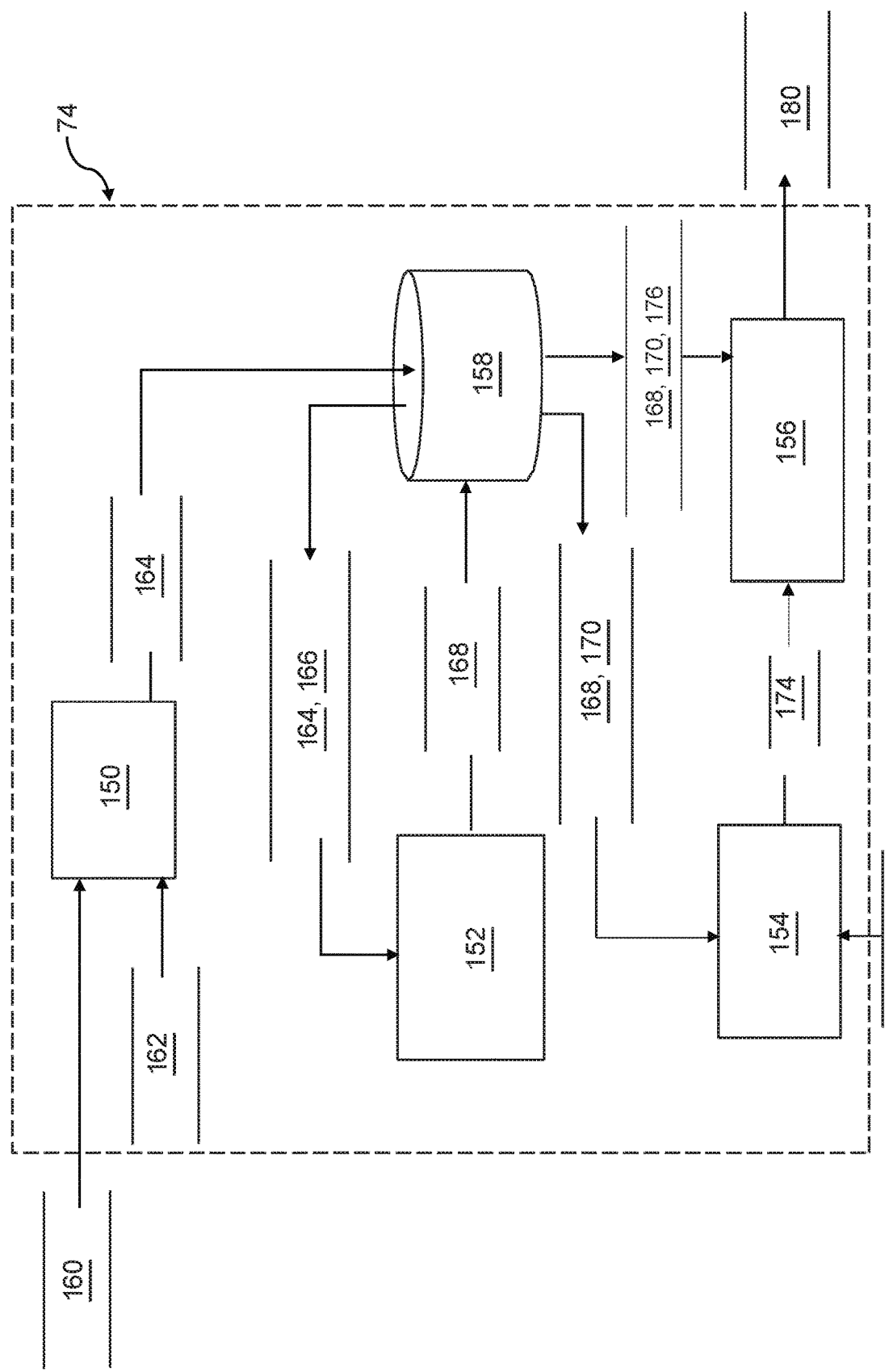
FIG. 4 is a dataflow diagram illustrating elements of a cooling control system of the drive and cooling system of FIGS. 1-3, in accordance with various embodiments.

Referring to FIG. 4, elements of the cooling control system 74 for dynamic flow control are illustrated in dataflow diagram form in accordance with various embodiments. As will be appreciated, various embodiments of the cooling control system 74 according to the present disclosure may include any number of modules embedded within the controller 54 or in multiple controllers, which may be combined and/or further partitioned to implement the systems and methods described herein. Inputs to the cooling control system 74 may be received from various sensors of the vehicle 20 including the temperature sensor 78, the throttle position sensor 80 and the vehicle speed sensor 82, from other control modules (not shown) associated with the vehicle 20, and/or determined by other sub-modules (not shown) within the controller 54. For simplicity, descriptions may refer to one controller 54, which means one or more controllers, including in the claims. The cooling control system 74 may be configured to include a flow rate requirements module 150, a composite rotor flow rate module 152, a pump flow rate module 154, a cooling system control module 156, and a datastore 158.

In various embodiments, the flow rate requirements module 150 receives as input sensed data 160 and flow rate model data 162, such as from the datastore 158. The sensed data 160 may include data from the temperature sensor 78, the throttle position sensor 80, the vehicle speed sensor 82, and other sensors as desired to account for parameters selected for control purposes. The flow rate model data 162 may include a model of the propulsion system 26 that correlates the sensed data 160 to flow rate requirements. As an example, a model for flow rate may comprise a two-dimensional lookup table that plots flow rate as a function of sump temperature indicated by the temperature sensor 78 versus torque demand indicated by the throttle position sensor 80. Similar approaches may be used for the other parameters. In other embodiments, math based models may be constructed using commercially available modelling software and/or by characteristic testing for a variety of parameters indicative of a cooling load need of the rotor 86. Similar approaches may be used for all of the models described herein. The flow rate requirements module 150 results in flow rate data 164 that may include a number of flow rate requirements based on different parameters. Accordingly, the flow rate data 164 includes a number of data points representing flow rate requirements of the rotor 86 based on different parameters. The flow rate data 164 obtained from the flow rate model data 162 and/or the sensed data 160 is stored in the datastore 158.

In various embodiments, the composite rotor flow rate module 152 receives as input the flow rate data 164 and combination model data 166, such as from the datastore 158. Because the flow rate data 164 includes a number of data points representing flow rate requirements of the rotor 86 based on different parameters, the composite rotor flow rate module 152 computes a single flow rate requirement for setting the control valve 76 based on current parameters. The combination model data 166 may be stored in the datastore when the vehicle 20 is manufactured and correlates the various values of the flow rate data 164 to a single calibrated flow rate requirement of the of the rotor 86. The composite rotor flow rate module 152 computes, using the flow rate data 164, and the combination model data 166, a required flow rate data 168 value for the control valve 76. In some embodiments, the composite rotor flow rate module 152 may select the value in the flow rate data 164 that has the greatest magnitude, ensuring that the flow rate supplied meets all requirements. In other embodiments, the combination model data 166 may weigh individual flow rate requirements and compute a composite value that is different than any of the individual values. For example, the number of parameters may compound the cooling requirements and lead to the computation of a flow rate that matches the compounded amount. The value of the required flow rate data 168 represents the flow rate of the fluid 88 to be supplied to the rotor 86 through the control valve 76. The required flow rate data 168 is stored in the datastore 158.

In various embodiments, the pump flow rate module 154 receives as input the required flow rate data 168, pump model data 170, such as from the datastore 158, and pump requirements data 172, such as from a remote module that determines pump flow requirements for the gear unit 32 and the stator 84. In some embodiments, the pump requirements data 172 may be fixed constant values regardless of operational parameters, where the values are determined during product development to ensure sufficient flow for all operating conditions. In other embodiments, the pump requirements may be determined in real-time based on current parameters. In embodiments, the pump flow rate module 154 adds the pump flow requirements for the gear unit 32 and the stator 84 as received in the pump requirements data 172 to the required flow rate data 168 to result in a value for total pump flow rate data 174.

Using the total pump flow rate data 174, the required flow rate data 168, the pump model data 170, and control valve model data 176, such as received from the datastore, the cooling system control module 156 generates control data 180 that controls the cooling system 68, such as by setting the opening state of the control valve 76 via a variable current signal, and setting the speed of the pump 72 via a variable current and/or voltage signal. For example, a lookup table or multiple lookup tables may be used to correlate flow requirements to electrical current supply based on the flow rates. In other embodiments, a more complex model may be used where the model is constructed using computational modelling software for analyzing the propulsion system 26 and/or using characteristic testing.

Figure 5:
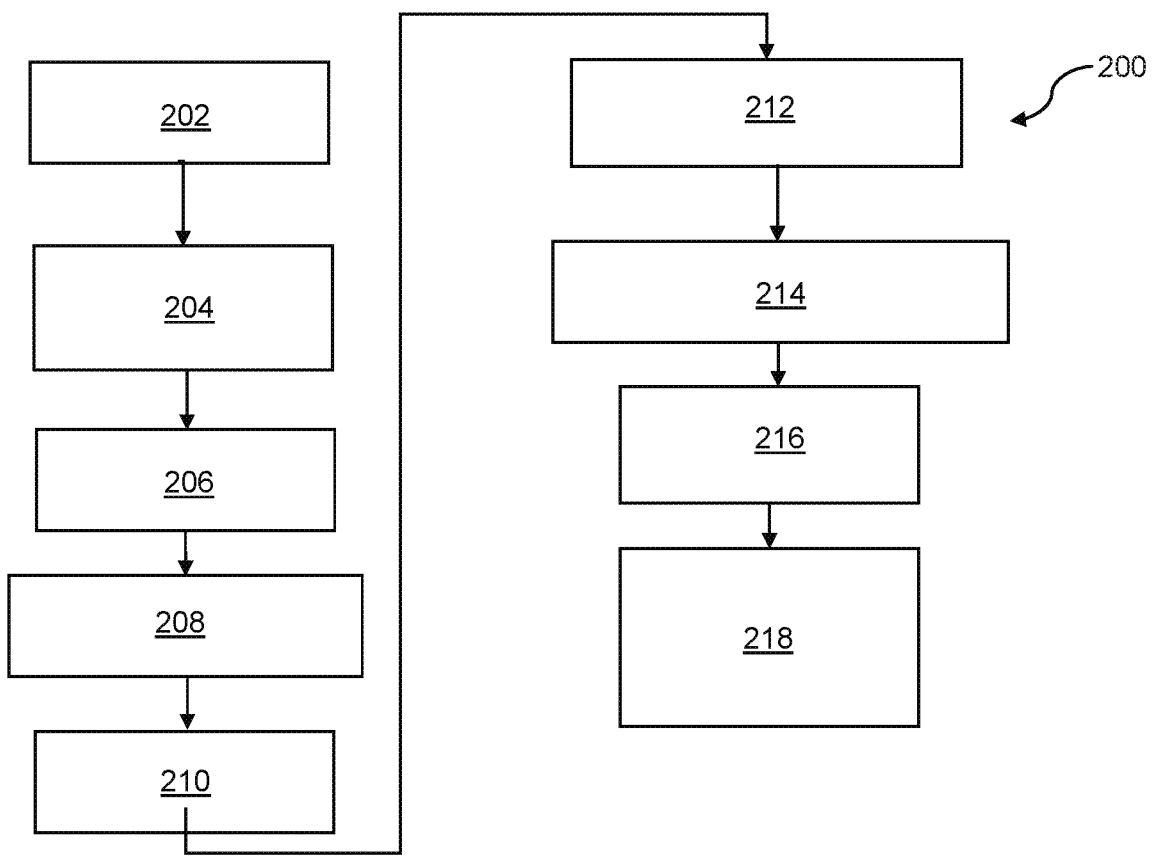
FIG. 5 is a flow chart of a process for cooling a rotor with a dynamically controller flow rate, in accordance with various embodiments.

Referring to FIG. 5, a method 200 is illustrated for operation of the cooling control system 74. As will be appreciated in light of the current disclosure, the order of operation of the steps within the method 200 is not limited to the sequential execution as illustrated in FIG. 5, but may be performed in one or more varying orders as applicable and in accordance with the present disclosure. In various embodiments, the method 200 may be scheduled to run based on one or more predetermined events, and/or may run continuously during operation of the vehicle 20. The method 200 reads 202 the torque demand as indicated by the throttle position sensor 80. The input on the throttle is an indication of how fast and how much the vehicle 20 is being accelerated and determines the amount of torque to be supplied by the electric machine 30. The torque demand correlates with heat generation and indicates the amount of cooling needed by the system components. The amount of cooling needed by the rotor 86 may be determined based on modelling using computational software and/or by experimentation/characteristic testing for various torque demands. Accordingly, the torque demand may be equated to an amount of flow needed by the rotor 86, such as by using a lookup table or another model. The method 200 computes 204 the flow rate of the fluid 88 needed to cool the rotor 86 based on the torque demand resulting in the computed flow rate 204.

The method 200 reads 206 the fluid temperature in the sump 70 as indicated by the temperature sensor 78. The fluid temperature is an indication of how hot the system is and how much cooling may be accomplished by circulating the fluid 88 at that temperature. The fluid temperature correlates to cooling requirements and indicates how effective circulating the fluid 88 is in removing heat. The amount of flow needed by the rotor 86 may be determined based on modelling using computational software and/or by experimentation/characteristic testing for various fluid temperatures. Accordingly, the fluid temperature may be equated to an amount of flow needed by the rotor 86, such as by using a lookup table or another model. The method 200 computes 208 the flow rate of the fluid 88 needed to cool the rotor 86 based on the fluid temperature resulting in the computed flow rate 208.

The method 200 reads 210 the speed of the electric machine 30 as indicated by the speed sensor 82. The speed sensor 82 may be the sensor used for determining speed of the vehicle 20 and directly correlates to the rotational speed of the electric machine 30. The rotational speed of the electric machine 30 is an indication of how much heat is generated by the rotor 86. The amount of flow needed by the rotor 86 may be determined based on modelling using computational software and/or by experimentation/characteristic testing for various speeds. Accordingly, the speed may be equated to an amount of flow needed by the rotor 86, such as by using a lookup table or another model. The method 200 computes 212 the flow rate of the fluid 88 needed to cool the rotor 86 based on the speed resulting in the computed flow rate 212.

The method 200 computes 214 a composite flow rate for cooling the rotor 86. Given the computed flow rates 204, 208 and 212, a single flow rate requirement for the rotor 86 is determined. In embodiments, the largest in magnitude of the computed flow rates 204, 208 and 212 may be selected ensuring that the computed composite flow rate 214 meets all of the individual flow rates. In other embodiments, each of the computed flow rates 204, 208 and 212 may be weighted and aggregated to compute 214 a composite flow rate that considers all parameters. For example, a multi-dimensional lookup table may be used to factor in each of the computed flow rates 204, 208 and 212 to give a single flow rate that factors in any cumulative effect of the parameters. The computed 214 composite flow rate is the flow rate to be achieved by the opening setting of the control valve 76.

The method 200 adds the computed 214 composite flow rate to the flow requirements of the pump 72 for supplying the gear unit 32 and the stator 84 to determine 216 a pump flow rate. The determined 216 pump flow rate may be a reduced value based on the computed 214 composite flow rate for the rotor 86. Because the control valve 76 is throttled more pressure remains available to supply the gear unit 32 and the stator 84. Accordingly, a compounded efficiency improvement may be realized that benefits from a reduction in drag for the rotor 86 and a reduction in energy consumption by the electric motor 73 of the pump 72. The method 200 sets 218 the control valve 76 to supply the computed 214 composite flow rate to the rotor 86, such as by selecting a corresponding current (or voltage) value from a lookup table, and sets the pump speed to supply the required flow rate from the pump 72, such as by selecting a current (or voltage) value from another lookup table. Setting the opening state of the control valve 76 via a variable current and/or voltage signal and setting the speed of the pump 72 via a variable current and/or voltage signal enables providing a dynamically controlled fluid flow rate as a function of operating conditions. The setting of the control valve 76 corresponds to cooling needs of the rotor 86. The speed setting of the pump 72 may be reduced when cooling needs of the rotor 86 are reduced, compounding the savings as less electrical energy is needed to rotate the rotor 86 and the electric motor 73 of the pump 72. For example, when maximum torque demands are placed on the electric machine 30, such as during acceleration, the control valve 76 may be fully opened. When less torque is required, the control valve 76 may be actively closed to different degrees based on the level of the demand. When little torque is required to maintain speed of the vehicle 20, the control valve 76 may be fully closed to maximize efficiency. The speed of the pump 72 may be increased when flow to the rotor 86 is increased and decreased when flow to the rotor 86 is decreased. A similar approach may apply to the parameters of speed and sump temperature, where the proportion the control valve 76 is open is related to the magnitude of the parameter. Monitoring the parameters enables ongoing active control during operation of the vehicle 20. The method 200 may repeatedly return to step 202 for as long as the propulsion system 26 is in operation.

Through the foregoing, a propulsion system 26 with a cooling system 68 enables minimizing flow rates to the rotor 86 and optimizing efficiency when maximum rotor cooling capacity is not needed. In addition, control of the rotor cooling flow rate enables controlling flow to the rotor independent of pump speed, which enables use of a smaller pump, if desired, in designing the propulsion system leading to across-the-board savings.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof

What is claimed is:

1. A system comprising:
   a controller coupled with an electric machine having a rotor, the controller configured to:
   evaluate parameters related to the electric machine for flow rate requirements of the rotor, where the flow rate requirements relate to cooling of the rotor;
   compute a flow rate of a fluid for cooling the rotor, where the flow rate is based on a composite of the flow rate requirements; and
   deliver a control valve signal to operate a control valve to supply the flow rate to the rotor based on the parameters,
   wherein the rotor includes a shaft with a bore, wherein the control valve is disposed to control the flow rate through the bore,
   wherein a guide extends into the bore, the guide configured to center the shaft, wherein the control valve extends into the guide.

2. The system of claim 1, wherein the parameters comprise a torque demand of the electric machine.

3. The system of claim 1, wherein the controller is configured to:
   receive cooling requirements for additional cooling needs;
   combine the cooling requirements with the flow rate requirements of the rotor to compute a pump flow rate; and
   deliver a pump signal to control a pump to supply the pump flow rate.

4. The system of claim 3, comprising:
   a gear unit engaged with the electric machine, the gear unit having a gear unit requirement for cooling; and
   a stator disposed around the rotor, the stator having a stator requirement for cooling,
   wherein the cooling requirements comprise the gear unit requirement and the stator requirement,
   wherein the pump is configured to circulate the fluid to the gear unit to meet the gear unit requirement and to the stator to meet the stator requirement.

5. The system of claim 1, wherein the guide has a tapered end configured to center the guide when inserted into the rotor.

6. The system of claim 1, wherein the guide has a center bore and the control valve includes a solenoid with a core aligned with the center bore.

7. The system of claim 1, wherein the parameters comprise a torque command of the electric machine, a temperature of the fluid, and a speed of the electric machine.

8. The system of claim 1, wherein the controller is configured to dynamically vary the flow rate through the rotor based on changes in the parameters.

9. The system of claim 1, wherein the electric machine is configured as a traction motor of a vehicle.

10. The system of claim 1, comprising a stator disposed around the rotor with a gap defined between the stator and the rotor, wherein the rotor includes a shaft having a bore, with openings extending through the shaft, the openings registering with the bore and the gap, so the fluid circulates through the gap, wherein the control valve is configured to control the fluid circulated through the gap.

11. A method comprising:
evaluating, by a controller, parameters related to an electric machine for flow rate requirements of a rotor of the electric machine, where the flow rate requirements relate to cooling of the rotor;
computing, by the controller a flow rate of a fluid for cooling the rotor, where the flow rate is based on a composite of the flow rate requirements;
delivering, by the controller, a control valve signal to operate a control valve to supply the flow rate to the rotor based on the parameters;
receiving, by the controller, cooling requirements for additional cooling needs;
combining, by the controller, the cooling requirements with the flow rate requirements of the rotor;
computing, by the controller, a pump flow rate using the cooling requirements and the flow rate requirements; and
delivering, by the controller, a pump signal to control a pump to supply the pump flow rate.

12. The method of claim 11, wherein the evaluating parameters comprise evaluating a torque demand of the electric machine.

13. The method of claim 11, comprising:
operating, by the controller, the valve to deliver an optimization, in terms of cooling, of the composite of the flow rate requirements as a function of speed of the rotor, torque demands on the electric machine and temperature of the fluid.

14. The method of claim 13, comprising:
engaging a gear unit with the electric machine, the gear unit having a gear unit requirement for cooling;
disposing a stator around the rotor, the stator having a stator requirement for cooling, wherein the cooling requirements comprise the gear unit requirement and the stator requirement; and
circulating, by the pump, the fluid to the gear unit to meet the gear unit requirement and to the stator to meet the stator requirement.

15. The method of claim 11, comprising:
including a shaft with a bore in the rotor; and
controlling, by the control valve, the flow rate through the bore.

16. The method of claim 15, comprising:
extending a guide into the bore;
centering the shaft by the guide; and
extending the control valve into the guide.

17. The method of claim 11, wherein the evaluating parameters comprise evaluating a torque command of the electric machine, a temperature of the fluid, and a speed of the electric machine.

18. The method of claim 11, comprising dynamically varying, by the controller, the flow rate through the rotor based on changes in the parameters.

19. The method of claim 11, comprising:
disposing a stator disposed around the rotor with a gap defined between the stator and the rotor;
including a shaft having a bore in the rotor;
providing openings extending through the shaft, the openings registering with the bore and the gap;
circulating the fluid through the gap: and
controlling, by the control valve, the fluid circulated through the gap.

20. A rotor cooling system for a drive system of a vehicle comprising:
an electric machine disposed in the drive system and configured to generate a torque to propel the vehicle;
a controller coupled with an electric machine having a rotor, the controller configured to:
evaluate parameters related to the electric machine for flow rate requirements of the rotor, where the flow rate requirements relate to cooling of the rotor;
compute a flow rate of a fluid for cooling the rotor, where the flow rate is based on a composite of the flow rate requirements; and
deliver a control valve signal to operate a control valve to supply the flow rate to the rotor based on the parameters,
a gear unit is engaged with the electric machine, the gear unit having a gear unit requirement for cooling; and
a stator around the rotor, the stator having a stator requirement for cooling, wherein cooling requirements comprise the gear unit requirement and the stator requirement,
wherein the controller is configured to operate a pump to circulate the fluid to the gear unit to meet the gear unit requirement and to the stator to meet the stator requirement.

* * * * *